United States Patent [19]

Burton et al.

[11] Patent Number: 4,870,759

[45] Date of Patent: Oct. 3, 1989

[54] ACTIVITY ENTRY APPARATUS FOR MAKING TIME ENTRIES ON PRE-ESTABLISHED TIME LOG FORMS

[76] Inventors: John F. Burton, Rt. 2, Box 31B, Worley, Id. 83876; Fred A. Rogers, Rt. 3, Box 842, Otis Orchards, Wash. 99027

[21] Appl. No.: 254,449

[22] Filed: Oct. 6, 1988

[51] Int. Cl.[4] .......... B43L 7/00; G01B 3/10

[52] U.S. Cl. .......... 33/563; 33/1 B

[58] Field of Search .......... 33/562, 563, 565, 566, 33/443, 430, 403, 1 B

[56] References Cited

U.S. PATENT DOCUMENTS

| | | | |
|---|---|---|---|
| D. 219,885 | 2/1971 | Amundson et al. . | |
| D. 254,314 | 2/1980 | Denslow . | |
| D. 284,089 | 6/1986 | Hines . | |
| 802,975 | 10/1905 | Cremers . | |
| 1,132,261 | 3/1915 | Heineck . | |
| 1,583,138 | 5/1926 | Garnett . | |
| 1,633,163 | 6/1927 | Crouse . | |
| 2,167,131 | 7/1939 | Weidenborner | 33/443 X |
| 2,226,906 | 12/1940 | Henderson et al. | 33/443 |
| 2,230,927 | 2/1941 | Bowman et al. | 33/443 |
| 2,251,845 | 8/1941 | Large | 33/443 |
| 3,144,716 | 8/1964 | Cich | 33/486 |
| 3,376,650 | 4/1968 | Cook . | |
| 3,905,117 | 9/1975 | Walton . | |
| 3,974,568 | 8/1976 | Linderman | 33/486 |

*Primary Examiner*—Harry N. Haroian

*Attorney, Agent, or Firm*—Wells, St. John & Roberts

[57] ABSTRACT

An activity entry apparatus for making activity entries onto pre-established time log activity forms is disclosed. The apparatus comprises a time log form overlay sheet of resilient and significantly transparent material having a series of writing instrument guides extending therethrough. The guides define a series of activity change segments having lengths at least great enough to extend from one time log form activity section to a directly adjacent time log form activity section. At least one such activity change segment has a length great enough to extend from and between activity sections on the time log form which are separated furthest from one another. The guides also define time interval segments which extend from the activity change segments. The time interval segments have lengths which are equal to predetermined distances between log form time indicator lines which represent selected intervals of time during the pre-established time period for a given activity on the time log form. The apparatus assists a timekeeper in quickly, easily and accurately logging time on particular pre-established forms.

20 Claims, 7 Drawing Sheets

ACTIVITY ENTRY APPARATUS FOR MAKING TIME ENTRIES ON PRE-ESTABLISHED TIME LOG FORMS

TECHNICAL FIELD

This invention relates to the entry of data onto preestablished established time log activity forms, and more particularly primarily to entry of such data onto truck drivers' daily time log forms.

BACKGROUND OF THE INVENTION

Regulatory requirements generally dictate that commercial truck drivers keep a daily time log, accurate to within 15 minute intervals, as to whether the driver is off duty, driving on duty, on duty but not driving, or in a truck sleeper berth. Commercial drivers keep track of their time with a log book having duplicate removable, standardized time log activity forms therein. The time log forms include a series of neighboring activity sections which are oriented horizontally along the length of the form. The neighboring sections comprise, (a) an off duty section for indicating when a driver is off duty, (b) a sleeper berth section for indicating when a driver is in a sleeper berth, (c) a driving section for indicating when a driver is driving on duty, and (d) an on duty but not driving section for indicating when a driver is on duty but not driving. A series of common vertical time indicator lines extends through the four activity sections These correspond to the hours, divided into 15 minute intervals, throughout a 24 hour day. FIG. 1 illustrates such a time log form with entries having been made up to 9:00 A.M., at which point the particular driver went back to driving.

Commercial drivers are required to keep their time logs current to the last 15 minute interval where a change of activity occurred, such as for example from being off duty to driving on duty. If the driver's log is not kept current in this manner, an appropriate authority on discovering this reports the matter subjecting the driver and carrier to fines and other penalties. It is particularly important that the driver's last line entry extend to and terminate in the driving section at the time the driver starts driving once again. It is also at this time where the driver is anxious to get back on the road, but must first take the time bring his or her log book current by making sure that the last entry line extends to the driving section at the then present time.

Most drivers presently draw freehand lines onto the time log forms to indicate their activity throughout the day. Long horizontal lines for indicating extended time spent for a given activity are generally not too difficult to draw However, it is not easy to draw freehand the vertical or short horizontal lines, especially when activity changes occur over a short period of time, because of the close proximity of the time interval lines on the form.

Some drivers use a straight-edge, such as a ruler or even the side of an object such as a matchbook cover, in an attempt to more neatly and accurately make entries onto the daily log. However, this is also awkward and difficult. The straight-edge must be manipulated several times to make a single entry, and typically covers portions of the log form necessary for viewing by the driver to accurately make the entry.

A need remains for an improved way for commercial drivers and other timekeepers to quickly, neatly, and accurately log their activity time on the required daily time log forms.

BRIEF DESCRIPTION OF THE DRAWINGS

The preferred embodiment of the invention is illustrated with the accompanying drawings, in which:

FIG. 7 is a front-side elevational view of the apparatus positioned over the FIG. 1 form which includes the entry of FIG. 6.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

Figure 1:
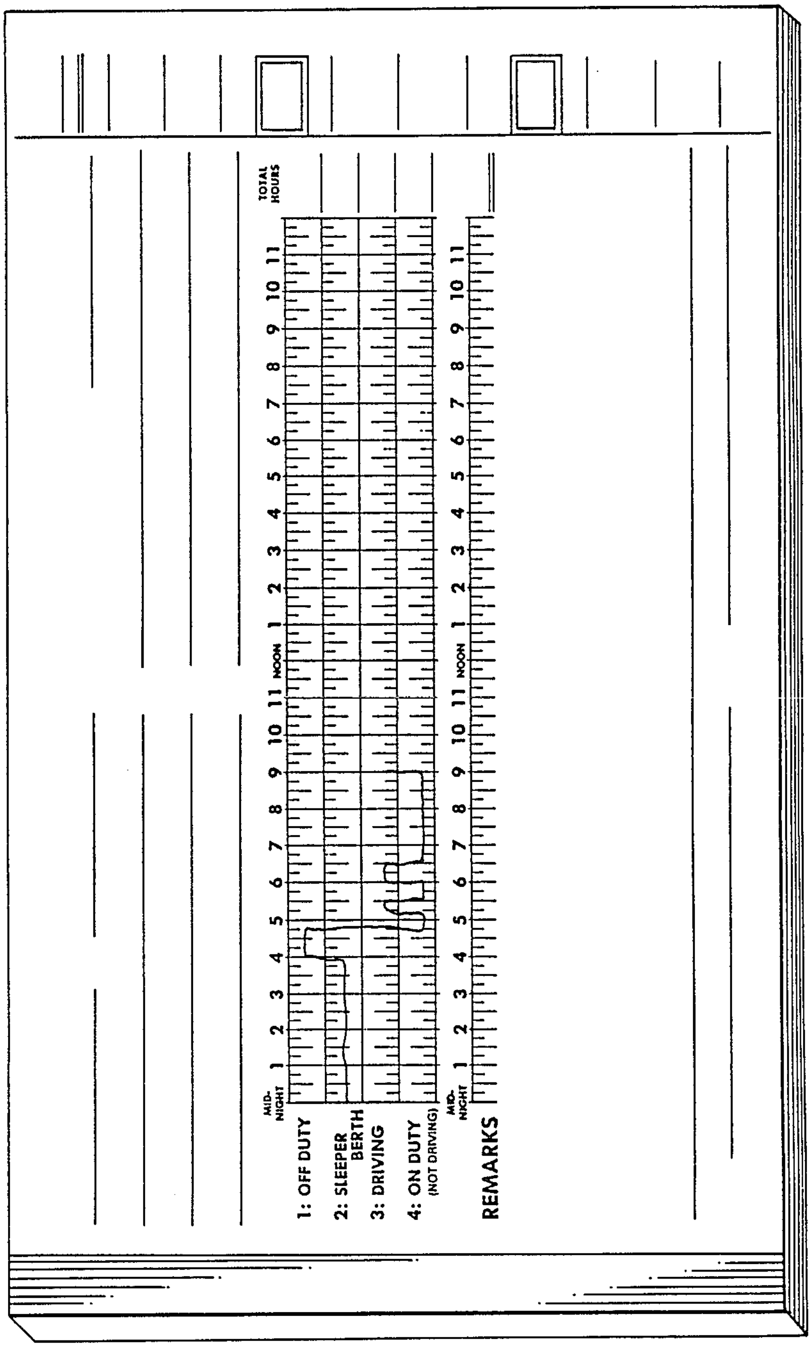
FIG 1 PRIOR ART
FIG. 1 is a perspective view of a driver's daily time log form indicating a driver's activity.

Referring to the figures, an activity entry apparatus for making activity entries onto a pre-established time log activity is indicated generally by reference numeral 10. The form, shown in FIG. 1, is comprised of a plurality of neighboring activity sections having a series of common time indicator lines for indicating activity over a pre-established period of time. The illustrated apparatus 10 is specifically configured or adapted for use with a truck driver's daily time log book having printed forms with neighboring activity sections organized in the order of (a) an off duty section, (b) a sleeper berth section, (c) a driving section, and (d) an off duty but not driving section, such as the one illustrated in FIG. 1. Using a pen or other writing instrument, a driver is able to use apparatus 10 as a tool to assist in accurately and neatly logging his or her time into a log book.

Figure 2:
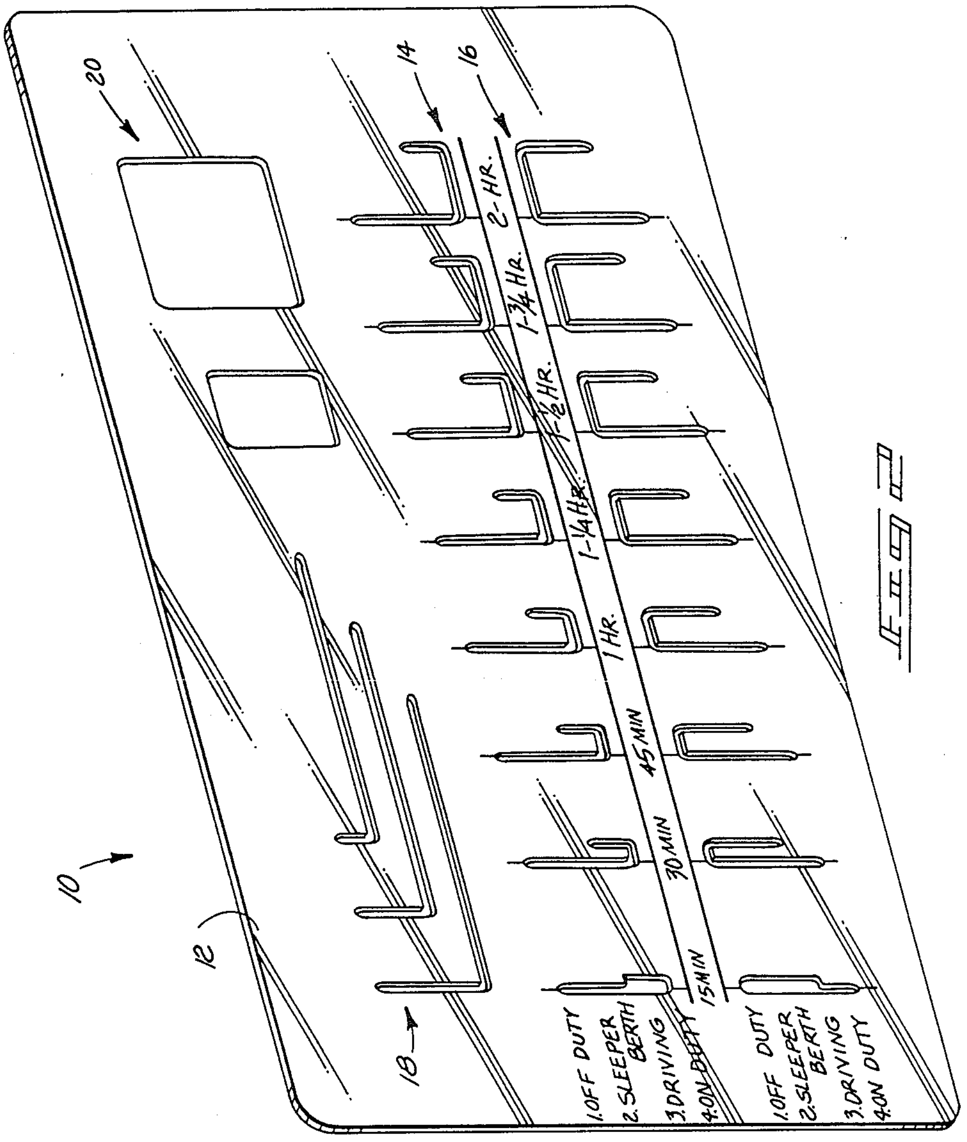
FIG. 2 is a perspective view of an activity entry apparatus for making activity entries onto the pre-established driver time log form of FIG. 1.
Figure 3:
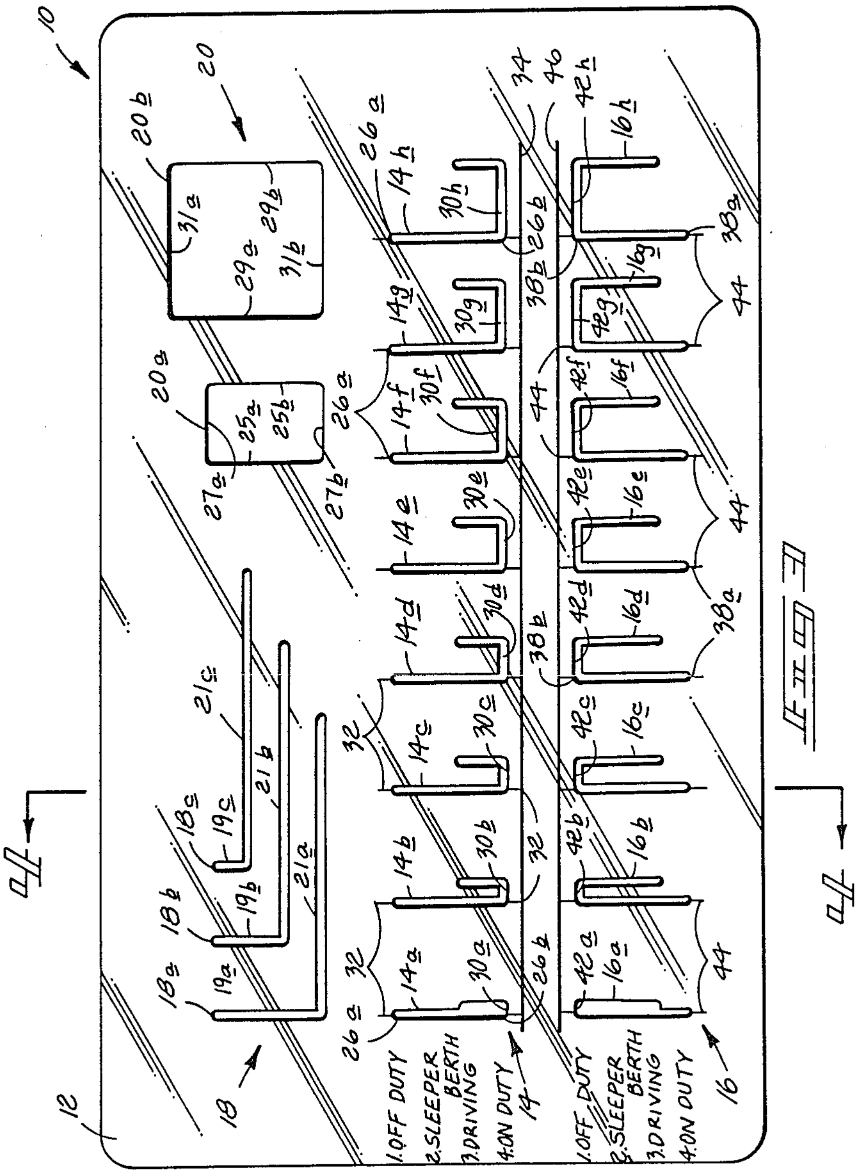
FIG. 3 is a front elevational view of the apparatus of FIG. 2.

Referring more particularly to FIGS. 2 and 3, apparatus 10 is comprised of a time log form overlay sheet 12 of resilient and significantly transparent material having a series of writing instrument guides extending therethrough. For ease of description, the illustrated writing instrument guides will be referred to as independent or discrete guide openings **14*a* through 14*h*, 16*a* through 16*h*, 18*a* through 18*c*, and 20*a* and 20*b*. Collectively, the independent guide openings define respective progression sequences 14, 16, 18 and 20**, as will be more fully explained below.

Figure 4:
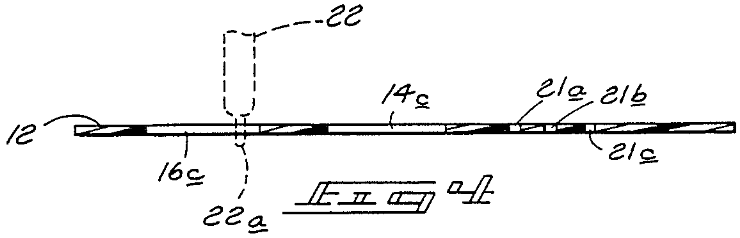
FIG. 4 is a cross-sectional view taken along line 4—4 in FIG. 3.

The writing instrument guides extending through sheet 10 have an open width which is at least great enough to receive the pointed end of a writing instrument therethrough. FIG. 4 illustrates a pen 22 with its pointed end 22a extending completely through a portion of guide opening 16c.

Figure 3A:
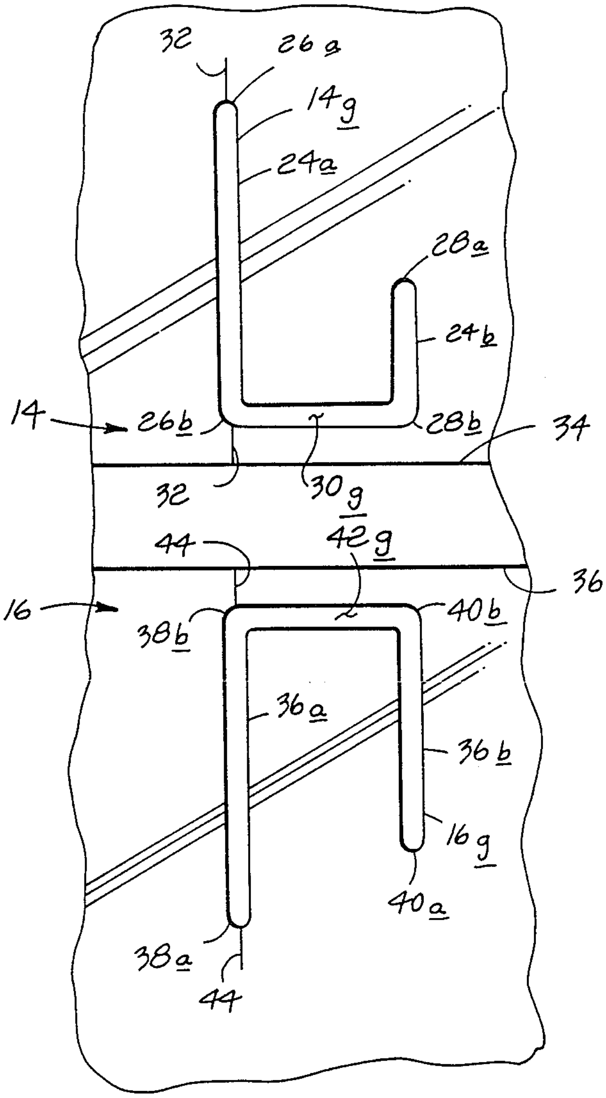
FIG. 3A is an enlarged view of a portion of FIG. 3.

Referring again to FIGS. 2, 3 and 3A, guide series 14 define a series of first and second activity change segments 24a, 24b respectively, which form selected adjacent pairs of activity change segments within each respective independent guide Opening 14a through 14h. First activity change segments 24a are of the same length, which is equal to the distance between the central portions of the off duty and on duty but not driving sections on the driver's time log form. These are the activity sections on the time log form which are separated the furthest distance from one another of the collective four neighboring sections. Second activity change segments 24b are also of a common length, the length being equal to the distance between the central portions of any two directly adjacent log form activity sections.

Each first activity change segment 24a has opposing ends 26a and 26b, while each second activity change segment 24b has opposing ends 28a and 28b. Ends 26b of segments 24a and ends 28b of segments 24b are horizontally coincident with one another on sheet 12. Ends 26a of segments 24a and ends 28a of segments 24b are horizontally displaced from one another due to the differing lengths of segments 24a and 24b.

Activity change segments 24a and 24b of discrete guide openings 14a through 14h are separated from one another by distances equal to predetermined distances between log form time indicator lines which represent selected intervals of time for a given activity on the log form. Respective time interval segments 30a through 30h are provided and extend between and interconnect ends 26b and 28b within each respective independent guide opening 14a through 14h. Accordingly, the lengths of the time interval segments are equal to the predetermined distances between log form time indicator lines corresponding to the separation distances of segments 24a and 24b within each guide opening. Time interval segments 30a through 30h are horizontally aligned relative to one another on sheet 12.

The separation distances between segments 24a and 24b within sequence 14, and correspondingly the lengths of time interval segments 30a through 30h, progressively increase in length within the sequence. The length of time interval segment 30a corresponds to 15 minutes of time on the time log form. Each sequential time interval segment 30b through 30h increases in length a distance equal to a 15 minute interval up to the point where the length of time interval segment 30h corresponds in length to two hours of time on the time log form.

Each first activity change segment 24a of each guide opening 14a through 14h includes time position log form overlay lines 32. These extend from opposed ends 26a and 26b of the first activity change segments on the front face of sheet 12. Lines 32 are oriented and adapted to assist the user in lining up a selected first activity change segment with a selected time indicator line on the log form. This will easily enable the user to indicate an activity change on the time log form at the particular time it occurs with a writing instrument received through such activity change segment, as is more fully described below.

Sheet 12 also includes a continuous activity position log form overlay line 34 which extends beneath and parallel with the aligned time interval segments 30a through 30h. Activity position log form overlay line 34 connects with time position log form overlay lines 30a through 30h extending from ends 26b of the first activity change segments 24a. Activity position overlay line 34 is oriented and adapted to be received directly over a boundary line of one of the log form activity sections. This assists the user in lining up a selected time interval segment 30a through 30h with a selected one of the log form activity sections for indicating time spent on an activity with the writing instrument received through such segment. In the illustrated embodiment, line 34 is oriented relative to series 14 for positioning over the bottom boundary line of the on duty but not driving activity section. This centrally positions segments 30a through 30h within the on duty but not driving activity section. Lines 32 and 34 greatly assist the user in easily, quickly and accurately lining up the desired discrete guide opening 14a through 14h in the desired position on the log form for indicating activity changes and logging time spent for a given activity, as will be more fully described below.

Series 16 of independent guide openings 16a through 16h is similar to series 14 and oriented in a substantial mirror image therebeneath. Each guide opening 16a through 16h includes a first activity change segment 36a corresponding in mirror position and length to first activity change segments 24a within series 14. Each guide opening 16a through 16h includes a second activity change segment 36b corresponding in mirror position to second activity change segments 24b of series 14. However, the lengths of second activity change segments 36b are longer than segments 24b, and are sufficient to extend between the central portions of the time log form off duty and driving sections. Each first activity change segment 36a includes opposing ends 38a and 38b, while each second activity change segment 36b includes opposing ends 40a and 40b.

A series of horizontally aligned time interval segments 42a through 42h extend between and interconnect ends 38b and 40b of activity change segments 36a and 36b respectively. Time interval segments 40a through 40h correspond in mirror position and length with time integral segments 30a through 30h of guide sequence 14. Time position log form overlay lines 44 extend from the opposing ends of each first activity change segment 36a. Lines 44 which extend from ends 38b of first activity change segments 36a extend to and connect with an activity position log form overlay line 46. Line 46 extends parallel with time interval segments 44 and in mirror orientation relative to line 34 of guide sequence 14. Activity position log form overlay line 46 is oriented and adapted to be received directly over the upper boundary line of the off duty section on the time log form. This will cause time interval segments 42a through 42h to be centrally received within the off duty section.

Sequences 14, 16 define first and second progression sequences having independent second activity change segments 24b, 36b. Second activity change segments 24b, 36b have ends 28a, 40a respectively, which terminate in the driving section on the time log form when sheet 12 is placed thereon when the respective first activity change segments are oriented to extend from the central portions of the off duty and the on duty but not driving sections. Specifically, the independent guide openings 14a through 14h have second activity change segments 24b which extend from and between the time log form on duty but not driving section and the driving section when the first activity change segment 24a of an independent guide opening 14*a* through 14*h* is positioned on the time log form and oriented to extend from and between the off duty and the on duty but not driving sections. Independent guide openings 16*a* through 16*h* have second activity change segments 36*b* which extend from and between the time log form off duty and the driving section when a first activity segment 26*a* is positioned on the time log form and oriented to extend from and between the off duty and the on duty but not driving sections.

Guide opening sequence 18 includes a series of three independent or discrete guide openings 18*a*, 18*b* and 18*c*. Each includes an activity change segment 19*a*, 19*b* and 19*c* respectively, and a time interval segment 21*a*, 21*b* and 21*c* respectively. The lengths of time interval segments 21*a*, 21*b* and 21*c* are the same, and equal 8 hours. The lengths of time interval segments 21*a*, 21*b* and 21*c* are different and increase in length within the sequence. The length of activity change segment 19*a* is equal to the distance between the central portions of the off duty and the on duty but not driving sections. The length of activity chain segment 19*b* is equal to the distance between the central portions of any two alternating activity sections on the time log form. The length of activity change segment 19*c* is equal to the distance between the central portions of any two directly adjacent activity sections on the time log form.

Guide opening series 20 is comprised of two rectangular openings 20*a* and 20*b*. Guide opening 20*a* defines two opposed activity change segments 25*a* and 25*b* which have a length equal to the distance between the central sections of the off duty and the on duty but not driving sections. Guide opening 20*a* also includes opposing time interval segments 27*a* and 27*b* corresponding in length to 2 hours on the time log form.

Guide opening 20*b* includes opposing vertical segments 29*a* and 29*b* having a length which is greater than the distance between the off duty and the on duty but not driving sections on the time log form. Guide opening 20*b* also includes opposed time interval segments 31*a* and 31*b* which correspond in length to 4 hours on the time log form.

OPERATION

Figure 5:
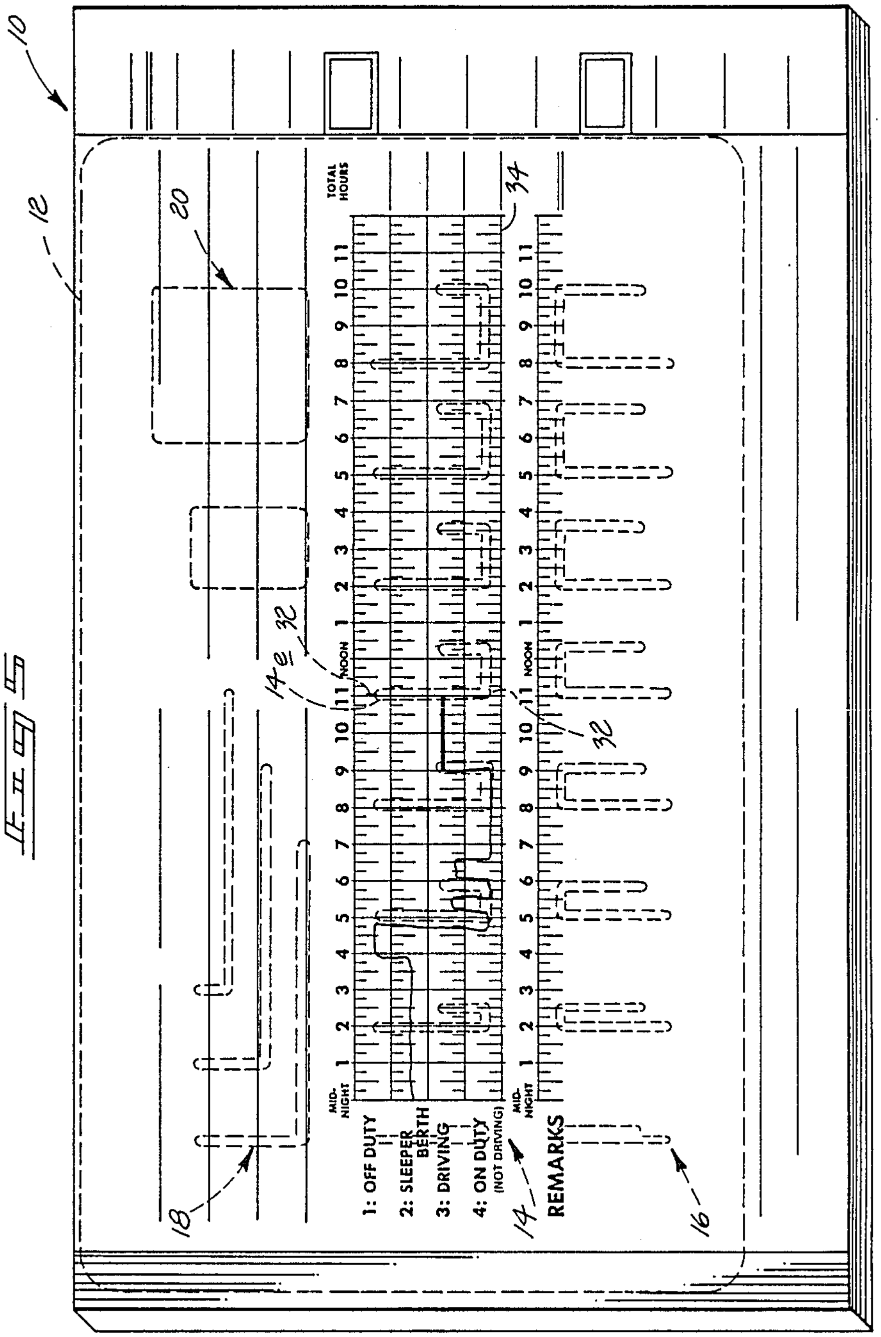
FIG. 5 is a front elevational view of the apparatus positioned over the form of FIG. 1.
Figure 11:
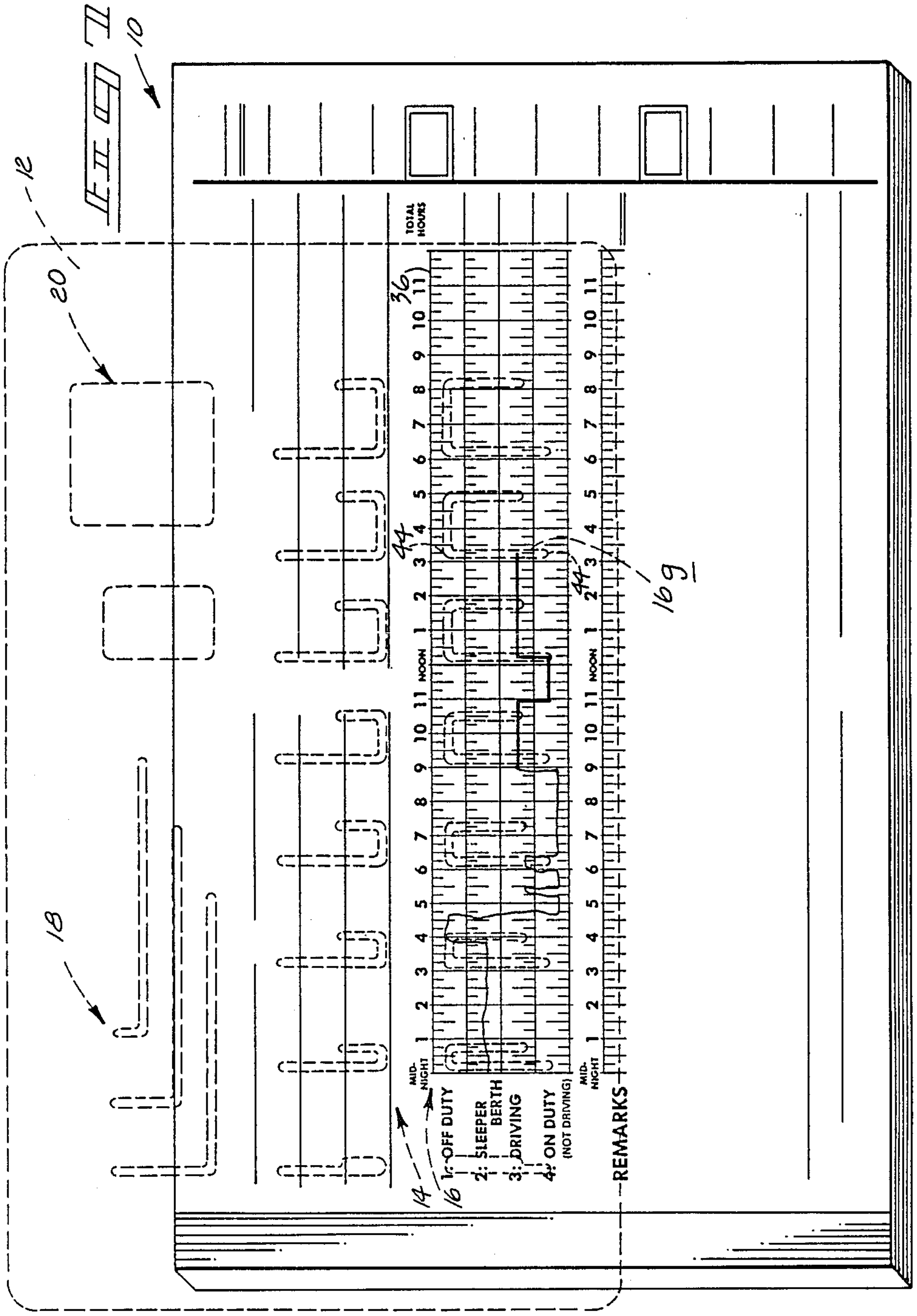

A description of use of the apparatus proceeds with reference to FIGS. 1, and 5–8. The following scenario is provided for a driver's activities from 9:00 a.m. to 5:00 p.m. which will be recorded on the form of FIG. 1 using apparatus 10. The trucker was driving from 9:00 a.m until 11 a.m., at which point he or she arrived at his or her location for discharge of a portion of the load. The driver could use an outer edge of the apparatus or any of the slots which is at least long enough to span a 2 hour time period on the log form. The driver would then draw a horizontal line from the 9:00 a.m. position to the 11:00 a.m. position in the driving section to make the log form appear as it is shown in FIG. 5.

It then takes the driver one and one-quarter hour, or until 12:15 p.m., to unload. At this point, the driver begins driving to the next destination. Before starting this next leg of the journey, it is necessary for the driver to enter his or her activity for the time from 11:00 a.m. to the point of starting to drive again at 12:15 p.m. As is required, the end of the next segment to be drawn must terminate in the driving section at 12:15 p.m. To quickly and easily make this entry, the driver would place apparatus 10 over the time log form with guide slot 14*e* (the one and one-quarter hour time guide of the 14 series guides) appropriately positioned over the form to draw the necessary lines with a pen. As illustrated in FIG. 5, sheet 12 would be positioned over the log form with time position log form overlay lines 32 extending from activity change segment 24*a* of guide slot 14*e* positioned directly over with the 11 a.m. time interval line. Sheet 12 is also oriented such that activity position log form overlay line 34 is positioned directly over the bottom boundary line of the on duty but not driving section. This properly locates time interval 30*e* of guide 14*e* centrally within the on duty but not driving section, and also positions the associated activity change segment 24*a* over the point where the last inked line ends on the form. The driver then places a pen in activity change segment 24*a* of guide 14*e* over that last point, and with one continuous stroke, guides and moves the pen to end 28*a* of activity change segment 24*b* of guide opening 14*e*. The driver then begins driving the next leg of the journey.

Figure 6:
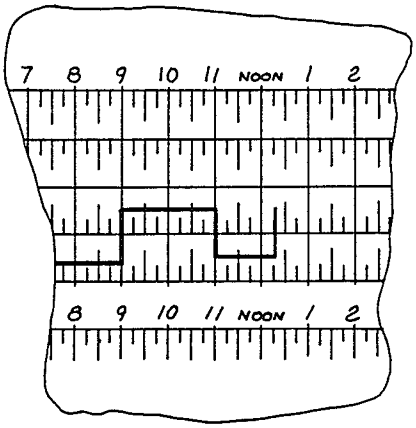
FIG. 6 is an enlarged view of a portion of the FIG. 1 form, illustrating an entry that has been made with a writing instrument and the apparatus as it is shown positioned in FIG. 5.
Figure 8:
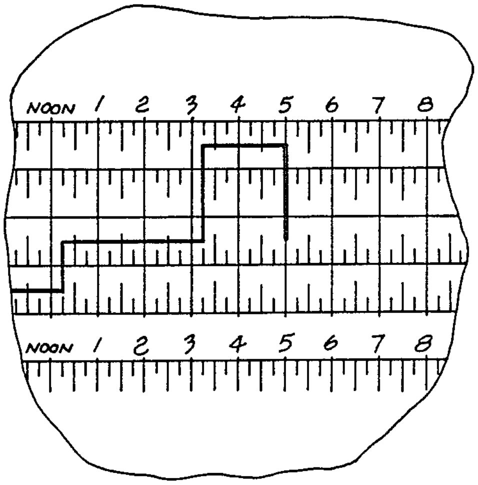
FIG. 8 is an enlarged view of a portion of the FIG. 1 form, illustrating an entry that has been made with a writing instrument and the apparatus as it is shown positioned in FIG. 7.

With the apparatus removed from the log form, the log form will now appear as illustrated in FIG. 6, with the last line terminating in the driving section at 12:15 p.m. The apparatus enables the user to quickly, easily and accurately make the appropriate log entries into the log form.

The independent guide openings 14*a* through 14*h* of guide series 14 are primarily intended for use for indicating any activity changes from being off duty, sleeper berth, or driving, to on duty but not driving and back to the driving activity. In other words, this series, primary use is for indicating activity changes that go from any activity section to the on duty but not driving section, and back to the driving section. Guide openings 16*a* through 16*h*, on the other hand, are primarily intended for use where the activity change is to off duty and then back to driving. As mentioned previously, a most important facet of maintaining the driver's time log up to date is to be sure that the last line drawn terminates in the driving section when the driver is on the road.

FIG. 7 illustrates use of one of the guide openings of series 16. The driver has now driven for three hours, or until 3:15 p.m. and properly drawn the three hour time line on the log form. At this point, the driver takes one and three-quarter hours of off duty time and returns to the truck at 5:00 p.m. to drive to another destination. Sheet 12 is positioned over the log form such that guide opening 16*h* (the one and three-quarter hours guide of the 16 series) is appropriately positioned to indicate that the off duty time has finished and the driver is again driving. Specifically, time position log form overlay lines 44 extending from the ends of activity change segment 36*a* of guide opening 36*g* are positioned to directly overly the 3:15 p.m. time interval lines on the time log form. Activity position log form overlay line 46 is positioned to directly overly the upper boundary line of the off duty section. The driver then positions a pen through guide opening 16*g* to coincide with the end of the last line which terminates in the driving section. The driver then draws a line with the guide to end 40*a* of activity change segment 36*b* to make a line which terminates again in the driving section. The guides of series 14 and 16 could also be used to indicate other various activity changes on the log form.

The guide openings of series 18 would be usable in connection with indicating activity changes or time intervals for any activity wherein the particular activity was engaged in for more than two hours, which is the longest time interval segment in the series 14, 16. Guide openings 20*a* and 20*b* of series 20 could similarly be used for making any desired straight line on the form.

While in the illustrated and preferred embodiments all of the respective guides are independently separate from one another, the guides could of course be interconnected without departing from the principles and scope of the invention. Furthermore, activity entry apparatus in accordance with the invention could be constructed to apply for other pre-established time forms and timekeepers other than truckers, use with their daily logs.

In compliance with the statute, the invention has been described in language more or less specific as to structural and methodical features. It is to be understood, however, that the invention is not limited to the specific features shown and described, since the means and construction herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An activity entry apparatus for making hand-drawn activity entries onto a pre-established vehicle driver's time log activity form, the time log form comprising a series of neighboring activity sections having a series of common time indicator lines for indicating driver activity over a pre-established period of time, the neighboring activity sections comprising: (a) an off duty section for indicating when a driver is off duty, (b) a sleeper berth section for indicating when a driver is in a sleeper berth (c) a driving section for indicating when a driver is driving on duty, and (d) an on duty but not driving section for indicating when a driver is on duty but not driving, the activity entry apparatus comprising:

a time log form overlay sheet of resilient and significantly transparent material having a series of writing instrument guides extending therethrough, the guides having an open width at least great enough to receive the pointed end of a writing instrument therethrough;

the guides defining a series of activity change segments having lengths at least great enough to extend from one time log form activity section to a directly adjacent time log form activity section;

at least one such activity change segment having a length great enough to extend from and between activity sections on the time log form having maximum separation from one another;

the series of activity change segments defining selected adjacent pairs of activity change segments, the activity change segments of the selected adjacent pairs being separated from one another by distances equal to predetermined distances between log form time indicator lines which represent selected intervals of time during the pre-established time period for a given activity on the time log form; and each guide defining at least one time interval segment extending between and interconnecting the activity change segments within each selected adjacent pair.

2. The activity entry apparatus of claim 1 wherein the activity change segments have opposing ends and the time interval segment has opposing ends the opposing ends of the time interval segment, connecting with one end of each activity change segment of each selected adjacent pair.

3. The activity entry apparatus of claim 1 wherein the sheet includes time position log form overlay lines extending from opposed ends of at least one activity change segment of each selected adjacent pair, the time position overlay lines being oriented to be received over a selected time indicator line on the log form for lining up such segment with the selected time indicator line to indicate an activity change on the log form with a writing instrument received through such segment.

4. The activity entry apparatus of claim 1 wherein the sheet includes an activity position log form overlay line which extends parallel with the one time interval segment, the activity change position overlay line being oriented to be received over a boundary line of one of the log form activity sections for lining up such time interval segment with a selected log form activity section to indicate time spent on an activity on the log form with a writing instrument received through such segment.

5. The activity entry apparatus of claim 4 wherein the sheet includes time position log form overlay lines extending from opposed ends of at least one activity change segment of each selected adjacent pair, the time position overlay lines being oriented to be received over a selected time indicator line on the log form for lining up such segment with the selected time indicator line to indicate an activity change on the log form with a writing instrument received through such segment.

6. The activity entry apparatus of claim 5 wherein the time position overlay lines extending from one of the ends of the activity change segments extend to and connect with the activity position overlay line.

7. The activity entry apparatus of claim 1 wherein, the selected adjacent pairs of activity change segments and their associated interconnecting time interval segments are separated from other selected pairs and their associated time interval segments, and thereby define independent sheet guide openings; and the independent guide openings being arranged on the sheet in a progression sequence, the time interval segment of each progressive guide opening progressively increasing in length in the sequence.

8. The activity entry apparatus of claim 7 wherein the time log form neighboring activity sections are organized in the order: (a) off duty section, (b) sleeper berth section, (c) driving section, and (d) on duty but not driving section, and the independent guide openings in the sequence include, a first activity change segment having a length great enough to extend from and between the off duty and on the duty but not driving sections; and a second activity change segment interconnected to the first by a time interval segment, the second activity change segment having an end which terminates in the driving section on the time log form when the overlay sheet is placed on the time log form with the first activity change segment being oriented to extend from and between the off duty and on duty but not driving sections 9. The activity entry apparatus of claim 8 wherein the sheet includes time position log form overlay lines extending from opposed ends of at least one of the first or second activity change segments of the independent guide openings, the time position overlay lines being oriented to be received over a selected time indicator line on the log form for lining up a selected independent guide opening relative to such selected time indicator line to indicate an activity change on the log form with a writing instrument received through such selected independent guide opening.

10. The activity entry apparatus of claim 8 wherein the sheet includes an activity position log form overlay line which extends parallel with the time interval segments Of the independent guide openings, the activity change position overlay line being oriented to be received over a boundary line of one of the log form activity sections for lining up the time interval segment of a selected independent guide opening with a selected log form activity section to indicate time spent on an activity on the log form with a writing instrument received through such selected independent guide opening.

11. The activity entry apparatus of claim 10 wherein the sheet includes time position log form overlay lines extending from opposed ends of at least one of the first or second activity change segments of the independent guide openings, the time position overlay lines being oriented to be received over a selected time indicator line on the log form for lining up a selected independent guide opening relative to such selected time indicator line to indicate an activity change on the log form with a writing instrument received through such selected independent guide opening.

12. The activity entry apparatus of claim 11 wherein the time position overlay lines extending from one of the ends of the activity change segments of the independent guide openings extend to and connect with the activity position overlay line.

13. The activity entry apparatus of claim 7 wherein the independent guide openings are arranged in multiple progression sequences.

14. The activity entry apparatus of claim 8 wherein,
the independent guide openings are arranged in first and second progression sequences;
the independent guide openings of the first sequence having second activity change segments which extend from and between the time log form on duty but not driving section and the driving section when the first activity change segment of an independent guide opening of the first sequence is positioned on the time log form and oriented to extend from and between the off duty and the on duty but not driving sections; and
the independent guide openings of the second sequence having second activity change segments which extend from and between the time log form off duty section and the driving section when the first activity segment of an independent guide opening of the second sequence is positioned on the time log form and oriented to extend from and between the off duty and the on duty but not driving sections.

15. An activity entry apparatus for making handdrawn entries onto a pre-established time log activity form, the time log form comprising a plurality of neighboring activity sections having a series of common time indicator lines for indicating activity over a pre-established period of time, the activity entry apparatus comprising:
a time log form overlay sheet of resilient and significantly transparent material having a series of writing instrument guides extending therethrough, the guides having an open width at least great enough to receive the pointed end of a writing instrument therethrough;
the guides defining a series of activity change segments having lengths at least great enough to extend from one time log form activity section to a directly adjacent time log form activity section;
at least one such activity change segment having a length great enough to extend from and between activity sections on the time log form having maximum separation from one another; and
the guides defining time interval segments which extend from the activity change segments, the time interval segments having lengths which are equal to predetermined distances between log form time indicator lines which represent selected intervals of time during the pre-established time period for a given activity on the time log form.

16. The activity entry apparatus of claim 15 the sheet includes time position log form overlay lines extending from opposed ends of at least one activity change segment, the time position overlay lines being oriented to be received over a selected time indicator line on the log form for lining up such segment with the selected time indicator line to indicate an activity change on the log form with a writing instrument received through such segment.

17. The activity entry apparatus of claim 15 the sheet includes an activity position log form overlay line which extends parallel with the time interval segments, the activity change position overlay line being oriented to be received over a boundary line of one of the log form activity sections for lining up a time interval segment with a selected log form activity section to indio ate time spent on an activity on the log form with a writing instrument received through such segment.

18. The activity entry apparatus of claim 17 the sheet includes time position log form overlay lines extending from opposed ends of at least one activity change segment, the time position overlay lines being oriented to be received over a selected time indicator line on the log form for lining up such segment with the selected time indicator line to indicate an activity change on the log form with a writing instrument received through such segment.

19. The activity entry apparatus of claim 18 where in the time position overlay lines extending from activity change segments extend to and connect with the activity position overlay line.

20. The activity entry apparatus of claim 15 wherein,
the guides are provided through the sheet in separate discrete sheet guide openings, each discrete opening having at least one activity change segment and one time interval segment; and
the discrete guide openings being arranged on the sheet in a progression sequence, at least one of the activity change segment or the time interval segment of each progressive discrete opening progressively increasing in length in the sequence.

* * * * *